United States Patent
Onizuka et al.

(10) Patent No.: US 10,263,433 B2
(45) Date of Patent: Apr. 16, 2019

(54) POWER SUPPLY DEVICE, POWER SUPPLY SYSTEM, AND SENSOR SYSTEM

(71) Applicant: KABUSHIKI KAISHA TOSHIBA, Tokyo (JP)

(72) Inventors: Kohei Onizuka, Tokyo (JP); Takeshi Ueno, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/706,957

(22) Filed: Sep. 18, 2017

(65) Prior Publication Data

US 2018/0145518 A1 May 24, 2018

(30) Foreign Application Priority Data

Nov. 21, 2016 (JP) ................... 2016-226175

(51) Int. Cl.
*H02J 7/00* (2006.01)
*H02J 7/34* (2006.01)
(Continued)

(52) U.S. Cl.
CPC ............ *H02J 7/0013* (2013.01); *H02J 7/007* (2013.01); *H02J 7/0063* (2013.01);
(Continued)

(58) Field of Classification Search
CPC ............. H02M 3/00; H02M 2001/009; H02M 3/3353; H02M 3/158; H02M 1/08;
(Continued)

(56) References Cited

U.S. PATENT DOCUMENTS 9,590,451 B2    3/2017  Fujimori et al.
2001/0035696 A1*  11/2001  Knowles ............... H01L 41/042
                                                 310/316.01
(Continued)

FOREIGN PATENT DOCUMENTS

AU    2015205956    6/2016
GB       2486008    6/2012
(Continued)

OTHER PUBLICATIONS

Bryan Esteban, Maher Sid-Ahmed and Narayan C. Kar, "A Comparative Study of Power Supply Architectures in Wireless EV Charging Systems", IEEE Transactions on Power Electronics, vol. 30, No. 11, University of Windsor, Canada, Jun. 2015.*
(Continued)

*Primary Examiner* — Aristocratis Fotakis
(74) *Attorney, Agent, or Firm* — Nixon & Vanderhye, P.C.

(57) ABSTRACT

According to one embodiment, a power supply device includes a voltage conversion circuit configured to convert a voltage of power generated by a power generation element; a plurality of power storage elements connected in parallel with respective load circuits; a switch circuit configured to switch an electrical connection between the voltage conversion circuit and each of the plurality of power storage elements; and a control circuit configured to measure voltages of the plurality of power storage elements and to control the switch circuit based on the measured voltages.

14 Claims, 11 Drawing Sheets

(51) Int. Cl.
  H02M 1/08   (2006.01)
  H02M 3/158  (2006.01)
  H02M 1/00       (2006.01)
  H02J 50/20      (2016.01)

(52) U.S. Cl.
  CPC ............ H02J 7/0068 (2013.01); H02J 7/345 (2013.01); H02M 3/1582 (2013.01); H02M 3/1584 (2013.01); *G08C 2201/11* (2013.01); *H02J 7/0054* (2013.01); *H02J 7/0055* (2013.01); *H02J 50/20* (2016.02); *H02J 2007/0067* (2013.01); *H02J 2007/0095* (2013.01); *H02M 2001/0006* (2013.01); *H02M 2001/008* (2013.01); *H02M 2001/009* (2013.01); *H04Q 2209/886* (2013.01)

(58) Field of Classification Search
  CPC ..... H02M 3/33561; H02M 2001/0006; H02M 3/1584; H02M 3/1588
  See application file for complete search history.

(56) References Cited

U.S. PATENT DOCUMENTS

| | | | |
|---|---|---|---|
| 2008/0231115 A1 | 9/2008 | Cho et al. | |
| 2012/0105043 A1* | 5/2012 | Wilson | H02M 3/158 323/304 |
| 2012/0139509 A1* | 6/2012 | Hunt | H02M 3/156 323/234 |
| 2012/0249103 A1 | 10/2012 | Latham, II et al. | |
| 2013/0099734 A1* | 4/2013 | Lee | H02J 7/007 320/108 |
| 2013/0234671 A1* | 9/2013 | Choi | H02J 7/0016 320/128 |
| 2013/0293012 A1 | 11/2013 | Song et al. | |
| 2014/0232189 A1 | 8/2014 | Gasparini et al. | |
| 2014/0285014 A1* | 9/2014 | Calhoun | H02M 3/158 307/31 |
| 2015/0042274 A1* | 2/2015 | Kim | H02J 7/06 320/108 |
| 2015/0372513 A1* | 12/2015 | Choi | H02J 7/0003 320/125 |
| 2015/0381067 A1* | 12/2015 | Choi | H02M 3/33561 307/32 |
| 2017/0201126 A1* | 7/2017 | Ahn | H02J 50/12 |

FOREIGN PATENT DOCUMENTS

| | | |
|---|---|---|
| JP | 2015-015848 | 1/2015 |
| WO | 2016/180970 | 11/2016 |

OTHER PUBLICATIONS

Extended Search Report dated Jan. 23, 2018 in counterpart European Patent Application No. 17191567.1.

* cited by examiner

US 10,263,433 B2

POWER SUPPLY DEVICE, POWER SUPPLY SYSTEM, AND SENSOR SYSTEM

CROSS REFERENCE TO RELATED APPLICATIONS

This application is based upon and claims the benefit of priority from the prior Japanese Patent Application No. 2016-226175, filed on Nov. 21, 2016, the entire contents of which are incorporated herein by reference.

FIELD

Embodiments described herein relate to a power supply device, a power supply system, and a sensor system.

BACKGROUND

A power supply device has been known which includes a primary power storage element, a plurality of secondary power storage elements, and a plurality of voltage conversion circuits (regulators) provided respectively between the plurality of secondary power storage elements and a plurality of load circuits. Power generated by a power generation element is preferentially charged to the primary power storage element, the electrical charge of the power is distributed to the secondary power storage elements, and thus, high-speed activation and supply of a desired voltage to each of the load circuits are both achieved.

In this power supply device, the number of components (the circuit scale) and the cost are increased because the voltage conversion circuits need to be provided for the respective load circuits. In addition, when a plurality of types of the power generation elements are provided, the voltage conversion circuits need to be provided also for respective output sides of the power generation elements. That is, both the power generation element side and the load circuit side need the voltage conversion circuits by the number of the power generation elements and the number of the load circuits. For this reason, the number of components (the circuit scale) and the cost are multiplied.

DETAILED DESCRIPTION

According to one embodiment, a power supply device includes a voltage conversion circuit configured to convert a voltage of power generated by a power generation element; a plurality of power storage elements connected in parallel with respective load circuits; a switch circuit configured to switch an electrical connection between the voltage conversion circuit and each of the plurality of power storage elements; and a control circuit configured to measure voltages of the plurality of power storage elements and to control the switch circuit based on the measured voltages.

Figure 1:
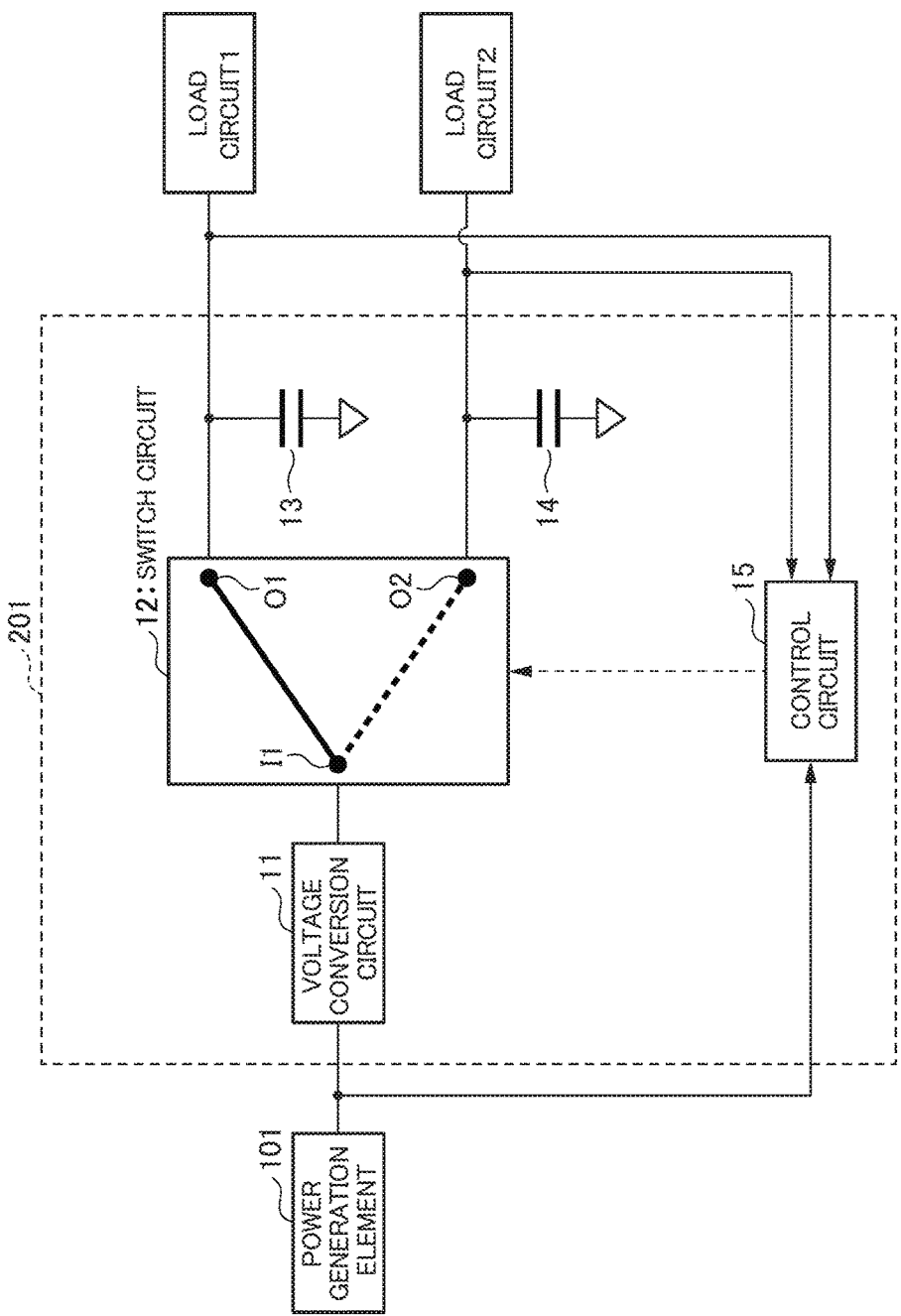
FIG. 1 is a configuration diagram of a power supply system including a power supply device according to a first embodiment.

FIG. 1 is a configuration diagram of a power supply system including a power supply device according to a first embodiment.

The power supply system includes a power generation element 101, a power supply device 201, and load circuits 1 and 2. Power generated by the power generation element 101 is converted by the power supply device 201, and is supplied to the load circuits 1 and 2.

The power generation element 101 generates power from an energy source such as harvested energy. The power generation element 101 is a power source which generates power fluctuating according to the environments and an output from which is unstable. Examples of the power generation element 101 include a solar cell, a thermoelectric power generation element (a Peltier element), and a piezoelectric element (a piezo-element).

The power supply device 201 includes a voltage conversion circuit 11, a switch circuit 12, power storage elements 13, 14, and a control circuit 15.

The voltage conversion circuit 11 converts the voltage of power generated by the power generation element 101. As the voltage conversion circuit 11, a DC/DC converter, a pair of a rectifier (an AC/DC converter) and a DC/DC converter, or the like can be used. The DC/DC converter steps an input voltage up or down (referred to as "steps up/down"), and thereby converts the input voltage into a different voltage. Specific examples of the DC/DC converter include a buck converter, a boost converter, a switched capacitor, and a linear regulator.

The switch circuit 12 switches an electrical connection between the voltage conversion circuit 11 and each of the power storage elements 13, 14. That is, the switch circuit 12 switches a connection destination of an output terminal of the voltage conversion circuit 11 to the load circuit 1 or the load circuit 2. The switch circuit 12 can be configured by using a MOS transistor or a bipolar junction transistor, etc.

The switch circuit 12 includes one input terminal I1 and two output terminals O1, O2. The input terminal I1 is electrically connected to the output terminal of the voltage conversion circuit 11. The output terminal O1 is electrically connected to the load circuit 1 and the power storage element 13. The output terminal O2 is electrically connected to the load circuit 2 and the power storage element 14.

The switch circuit 12 includes a switch that switches the electrical connection between the input terminal I1 and the output terminal O2. When the switch is turned on, a power supply path 1 between the input terminal I1 and the output terminal O1 is formed. When the switch is turned off, the power supply path 1 is disconnected. Further, the switch circuit 12 includes a switch that switches the electrical connection between the input terminal I1 and the output terminal O2. When the switch is turned on, a power supply path 2 between the input terminal I1 and the output terminal O2 is formed. When the switch is turned off, the power supply path 2 is disconnected. The embodiment illustrated in FIG. 1 shows the state where the power supply path 1 is formed between the input terminal I1 and the output terminal O1 (a solid line connects I1 to O1), whereas the power supply path 2 is not formed between the input terminal I1 and the output terminal O2 (a broken line connects I1 to O2). Hereinafter, forming a power supply path might be referred to as "turning on a power supply path", and disconnecting a power supply path might be referred to as "turning off a power supply path".

In the present embodiment, one of the power supply paths is turned on. However, both of the power supply paths may be turned on. In this case, currents outputted from the voltage conversion circuit 11 are supplied to be distributed to both the load circuits 1 and 2. Alternatively, both the power supply paths may be turned off. In this case, power generated by the power generation element 101 is discarded via a grounded terminal or a voltage protective element.

The power storage element 13 is connected in parallel to an input side of the load circuit 1. The power storage element 14 is connected in parallel to an input side of the load circuit 2. The power storage elements 13, 14 each include a capacitive element such as a capacitor. One end of the power storage element 13 is connected to the output terminal O1 of the switch circuit 12 and an input terminal of the load circuit 1. The other end of the power storage element 13 is connected to a reference terminal (a grounded terminal). One end of the power storage element 14 is connected to the other output terminal O2 of the switch circuit 12 and an input terminal of the load circuit 2. The other end of the power storage element 14 is connected to a reference terminal (a grounded terminal). Examples of the load circuits include a sensor, a wireless IC, an actuator, and a motor. Specific examples of the actuator include a vibrator. The examples of the load circuits recited herein are merely examples, and various circuits may be used as the load circuits.

The control circuit 15 measures the voltages (input voltages to the load circuits 1, 2) of the power storage elements 13, 14, and controls the switch circuit 12 based on the measured voltages. The control circuit 15 measures not only the voltage of the power storage element (from which the power supply path to the voltage conversion circuit is turned on) connected to the voltage conversion circuit 11 but also the voltage of the power storage element (from which the power supply path to the voltage conversion circuit is not turned on) not connected to the voltage conversion circuit 11. The control circuit 15 may measure, in addition to or instead of the voltages of the power storage elements 13, 14, at least one of the voltage or current outputted from the power generation element 101, the voltage or current outputted from the voltage conversion circuit 11, and the currents of the load circuits 1, 2, and may use the measured voltage or current. The internal voltage of the voltage conversion circuit 11, e.g., the voltage of an intermediate node between a rectifier (AC/DC converter) and a DC/DC converter if the rectifier and the DC/DC converter are included, may be used.

The control circuit 15 may be a processor, such as an MPU (micro processing unit) or a CPU (central processing unit), which interprets and executes a program code, or may be an application specific semiconductor integrated circuit, a field programmable gate array (FPGA), or a programmable logic circuit (PLD). The present embodiment is described on the assumption that the control circuit 15 is an MPU.

An operation example of the control circuit 15 is as follows. In a state where the load current of the load circuit 1 is larger than that of the load circuit 2, or where the voltage of the power storage element 13 for the load circuit 1 is lower than a target value, the control circuit 15 controls the switch circuit 12 such that a priority in terms of a time period is given to power supply to the load circuit 1. That is, the switch circuit 12 is preferentially connected to the load circuit 1.

The priority levels of the load circuits 1, 2 or the ratio of times for setting the power supply paths 1, 2 is stored in advance, for example, in a non-volatile memory installed in or connected to the control circuit 15. However, a configuration may be used in which the switch circuit 12 is optimally controlled using machine learning, etc. through the program in the control circuit 15. In addition, even in a state where the power supply path 1 to the load circuit 1 is set by the control circuit 15, the control circuit 15 continues to measure either or both of the load current from the load circuit 2 and the stored power voltage in the power storage element 14, whereby performs prompt control of the switch circuit 12 in order to avoid a situation where the load current and/or stored power voltage rapidly varies to deviate from a target value/target range.

For example, it is assumed that the load circuit 1 is a sensor and the load circuit 2 is a wireless unit (a wireless IC). In this case, the present power supply system is used as a sensor terminal (a wireless sensor device) configured to transmit, through the wireless IC, data detected by the sensor. In many cases, it is preferable that the sensor continuously operates. Thus, the wireless IC is required to perform a transmission operation at a timing at which an amount of the accumulated sensor data reaches a certain level. Accordingly, the switch circuit 12 is controlled such that the power storage element 13 for the sensor maintains the voltage at a certain level or higher all the time and continuously stable operation (even if the power generation element 101 temporarily stops generating power) of the sensor is allowed. When the control circuit 15 predicts or detects occurrence of a transmission request from the wireless IC, or receives an instruction from an external device (not illustrated), the power storage element 14 for the wireless IC may be preferentially charged (for example, until a predetermined voltage is reached, the power storage element 14 is preferentially charged). In a case where an alert signal is transmitted from the wireless IC due to, e.g., an abnormality shown in the sensor data, giving higher priority to charging of the power storage element 14 for the wireless IC becomes effective.

In the configuration in FIG. 1, the power storage element 13 is provided between the switch circuit 12 and the load circuit 1 and the power storage element 14 is provided between the switch circuit 12 and the load circuit 2. Accordingly, even when the load currents or target operational voltages of the load circuits 1, 2 are significantly different from each other, this difference is dealt with by selecting the respective optimum power storage elements for the load circuits 1, 2 in view of the time periods of charging/discharging the power storage elements 13, 14. The occupation volume of the voltage conversion circuit 11 is likely to increase due to an external element such as an inductor. However, only one voltage conversion circuit 11 needs to be provided on the power generation element 101 side, and a voltage conversion circuit for each of the load circuits does not need to be provided. Therefore, downsizing and low cost of the device can be achieved.

According to the present embodiment described above, any voltage conversion circuit does not need to be provided on the load circuits side and the voltage conversion circuit needs to be provided only on the power generation element side. Therefore, downsizing and low cost of the device can be achieved.

Second Embodiment

Figure 2:
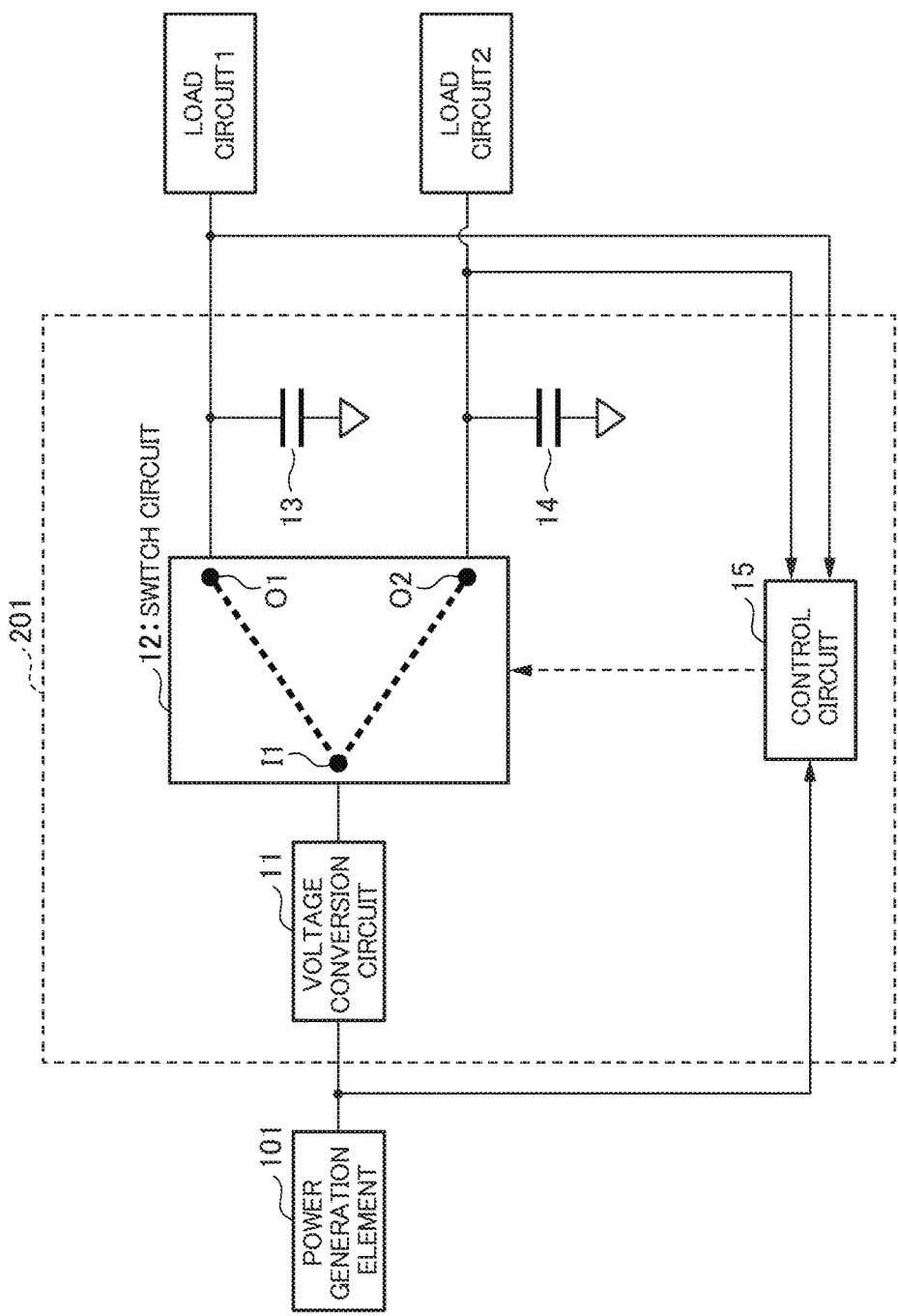
FIG. 2 is a configuration diagram of a power supply system including a power supply device according to a second embodiment.

FIG. 2 is a configuration diagram of a power supply system including a power supply device according to a second embodiment. Components identical or corresponding to those in FIG. 1 are denoted by the same reference numerals, and explanations thereof are omitted.

In a state where the control circuit 15 is not activated or the control circuit 15 is not performing a control operation (for example, in a sleep state), both the two power supply paths in the switch circuit 12 are turned off. Accordingly, when an operation of the control circuit 15 is started, flows of unexpected currents into the load circuits and the power storage elements are prevented so that a delay of an originally required rise in the path voltage is prevented.

The configuration in which both of the two power supply paths in the switch circuit 12 are turned off can be achieved as follows. The switch circuit 12 is configured by a switching element such as a MOS transistor, a bipolar junction transistor, or a diode element. When no control signal is inputted from the control circuit 15, both the two power supply paths are turned off by application of a bias voltage/current through a pull-up/down resistor, etc. After an operation of the control circuit 15 is started, the switching element in the switch circuit 12 may be controlled by a control signal from the control circuit 15 such that a required one of the power supply paths is turned on.

Third Embodiment

Figure 3:
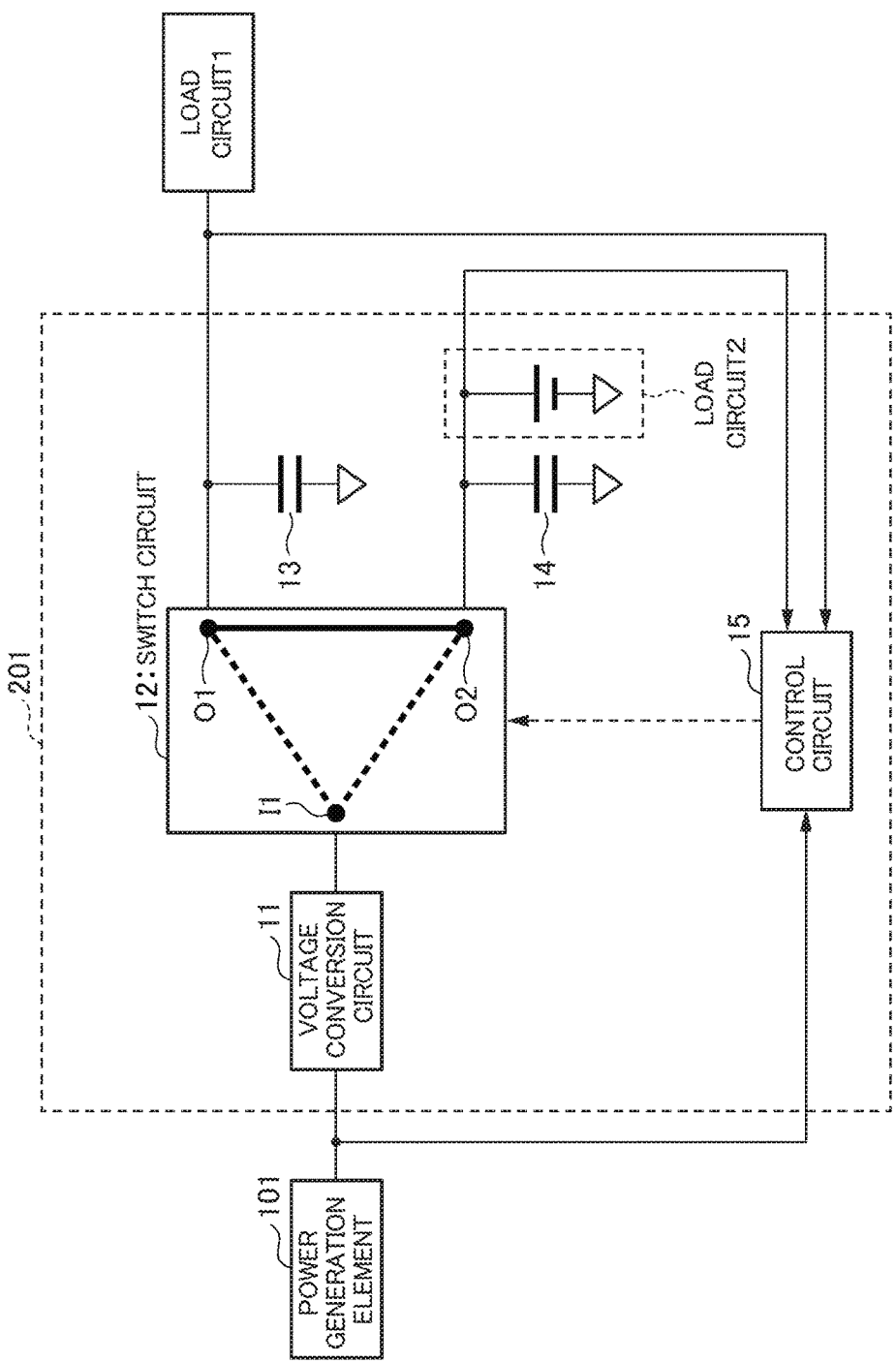
FIG. 3 is a configuration diagram of a power supply system including a power supply device according to a third embodiment.

FIG. 3 is a configuration diagram of a power supply system including a power supply device according to a third embodiment. Components identical or corresponding to those in FIG. 1 are denoted by the same reference numerals and explanations thereof are omitted.

It is assumed that one (here, the load circuit 2) of the load circuits is a power storage capacity such as a ceramic capacitor or a super capacitor, or is a secondary battery. Examples of such a secondary battery include a lithium-ion battery or a solid battery. The embodiment illustrated in FIG. 3 shows a case where the load circuit 2 is a secondary battery.

The switch circuit 12 switches a connection between the load circuit 1 and the load circuit 2 (a power storage capacity or a secondary battery). That is, the switch circuit 12 has, in addition to the configuration of the first or the second embodiment, a configuration of turning on/off a power supply path for connecting the two output terminals O1, O2 to each other. Accordingly, even in a state where, for example, the voltage of a terminal of the power storage element 13 connected to the load circuit 1 has reached an allowable upper-limit voltage of the load circuit 1 and any further charging cannot be performed, energy can be accumulated in the load circuit 2 (a power storage capacity or a secondary battery) as a result of connecting the output terminals O1 and O2 to each other. Moreover, in a state where output power from the power generation element 101 is in short, the energy accumulated in the load circuit 2 may be supplied to the load circuit 1. As a result, even in a case where the stability of the power generation element 101 is low and the upper-limit output power is small, the load circuit 1 can be stably operated.

Fourth Embodiment

Figure 4:
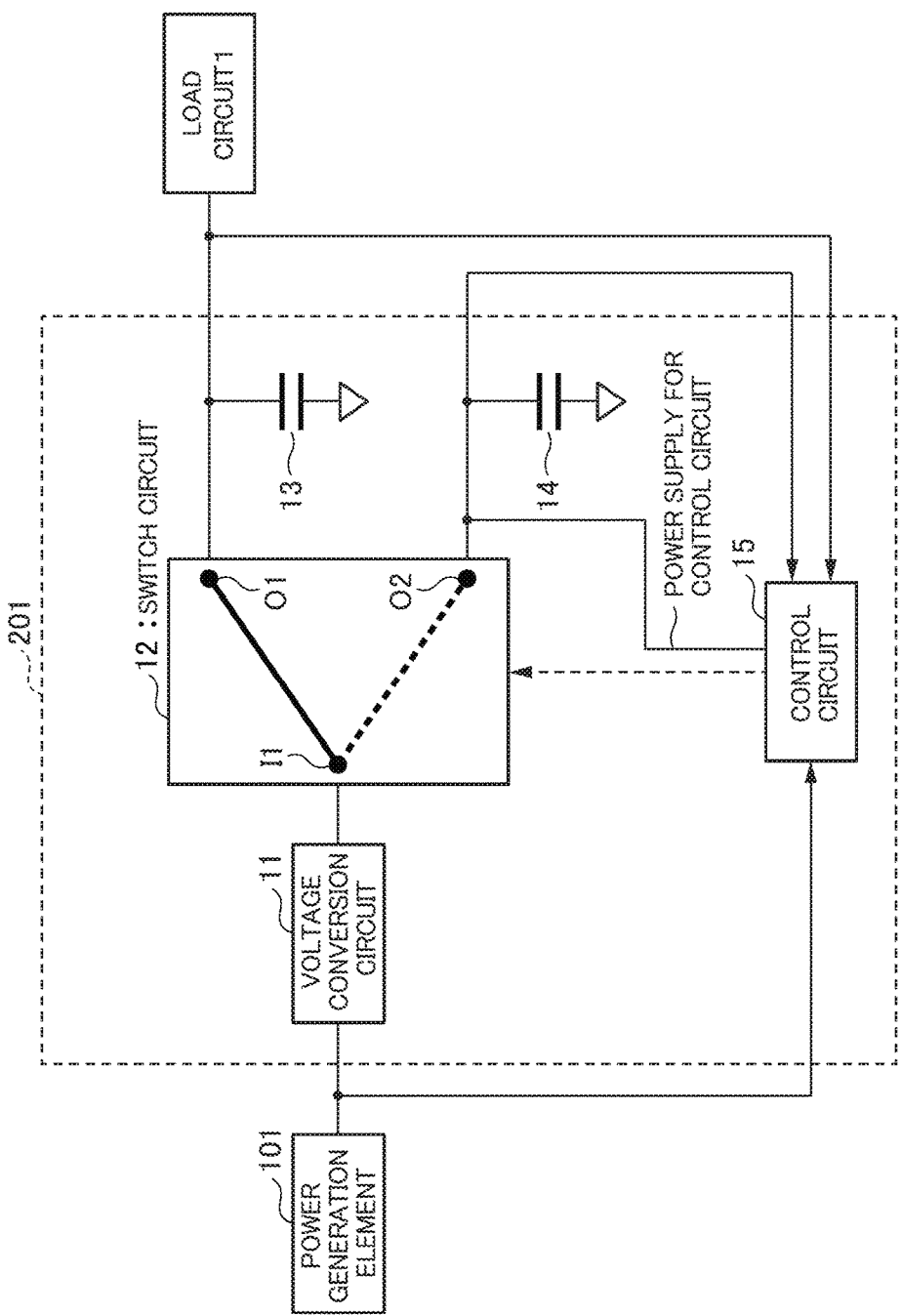
FIG. 4 is a configuration diagram of a power supply system including a power supply device according to a fourth embodiment.

FIG. 4 is a configuration diagram of a power supply system including a power supply device according to a fourth embodiment. Components identical or corresponding to those in FIG. 1 are denoted by the same reference numerals and the explanations thereof are omitted.

In the present embodiment, as one of the load circuits, the control circuit 15 can receive power supply. A power supply terminal of the control circuit 15 is electrically connected to the output terminal O2 of the switch circuit 12. Accordingly, any independent power supply circuit does not need to be provided to the control circuit 15, required power can be covered by generated power such as harvested energy alone. Alternatively, even in a case where an independent power supply circuit such as a secondary battery exists in the control circuit 15, an operation of the control circuit 15 can be kept by supplying generated power energy to the control circuit 15 when the battery capacity becomes insufficient.

According to the present embodiment, the control circuit 15 can be started up and a control operation can be started, by use of generated power energy without providing an independent power supply circuit for the control circuit 15.

Fifth Embodiment

Figure 5:
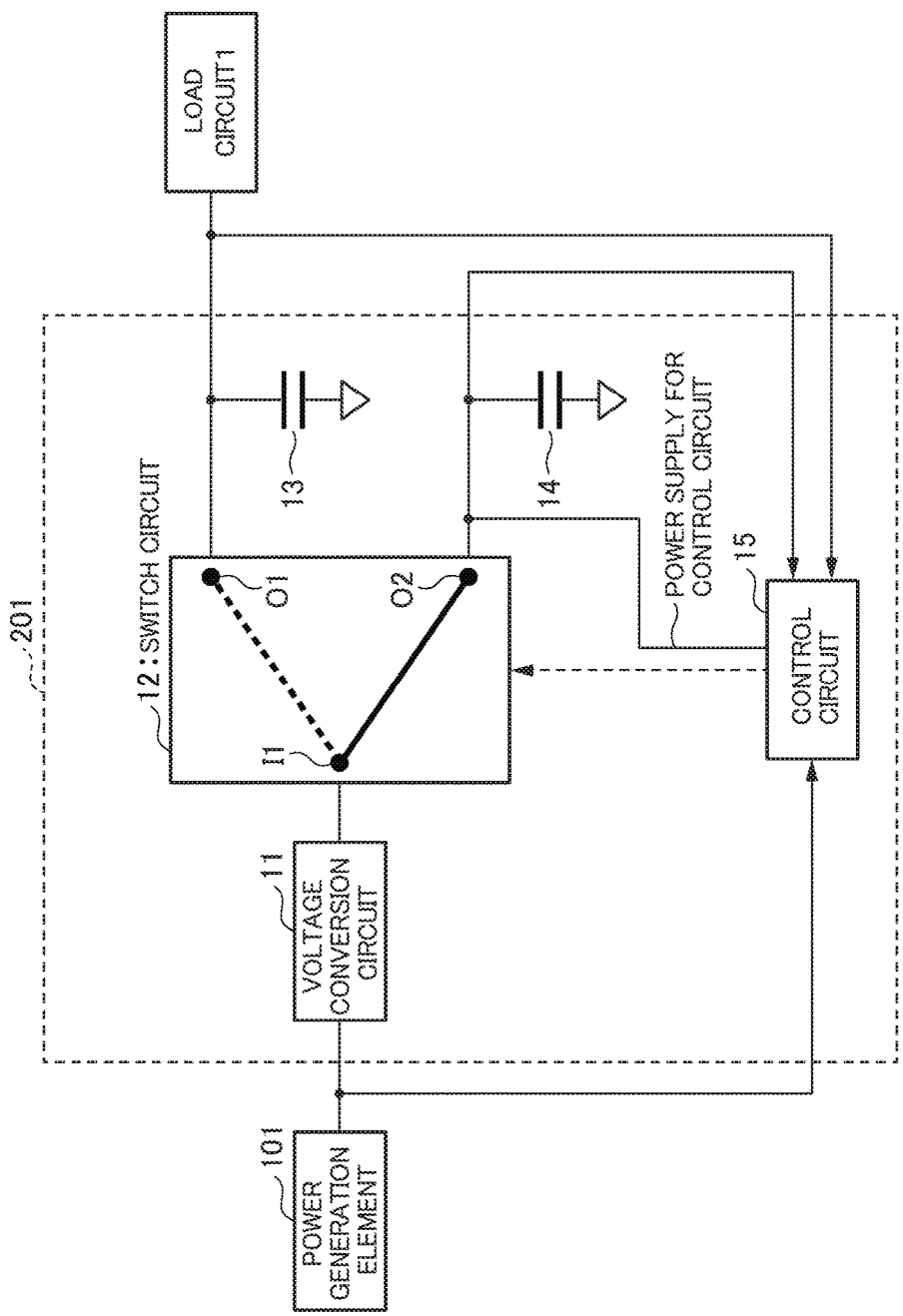
FIG. 5 is a configuration diagram of a power supply system including a power supply device according to a fifth embodiment.

FIG. 5 is a configuration diagram of a power supply system including a power supply device according to a fifth embodiment. Although the basic configuration of the fifth embodiment is similar to that of the fourth embodiment, an operation in the fifth embodiment differs from that in the fourth embodiment.

In the present embodiment, when the control circuit 15 is not performing a control operation (the power supply device is turned off or in a sleep mode), the switch circuit 12 is set such that generated power is supplied to the control circuit 15 and the power storage element 14. Accordingly, the control circuit 15 is preferentially activated during an activation of the power supply device, and thereafter, power supply to the load circuit 1 and the power storage element 13 can be appropriately started.

According to the present embodiment, without providing an independent power supply circuit for the control circuit 15, the control circuit 15 can be activated and a control operation can be started by use of generated power energy.

Sixth Embodiment

Figure 6:
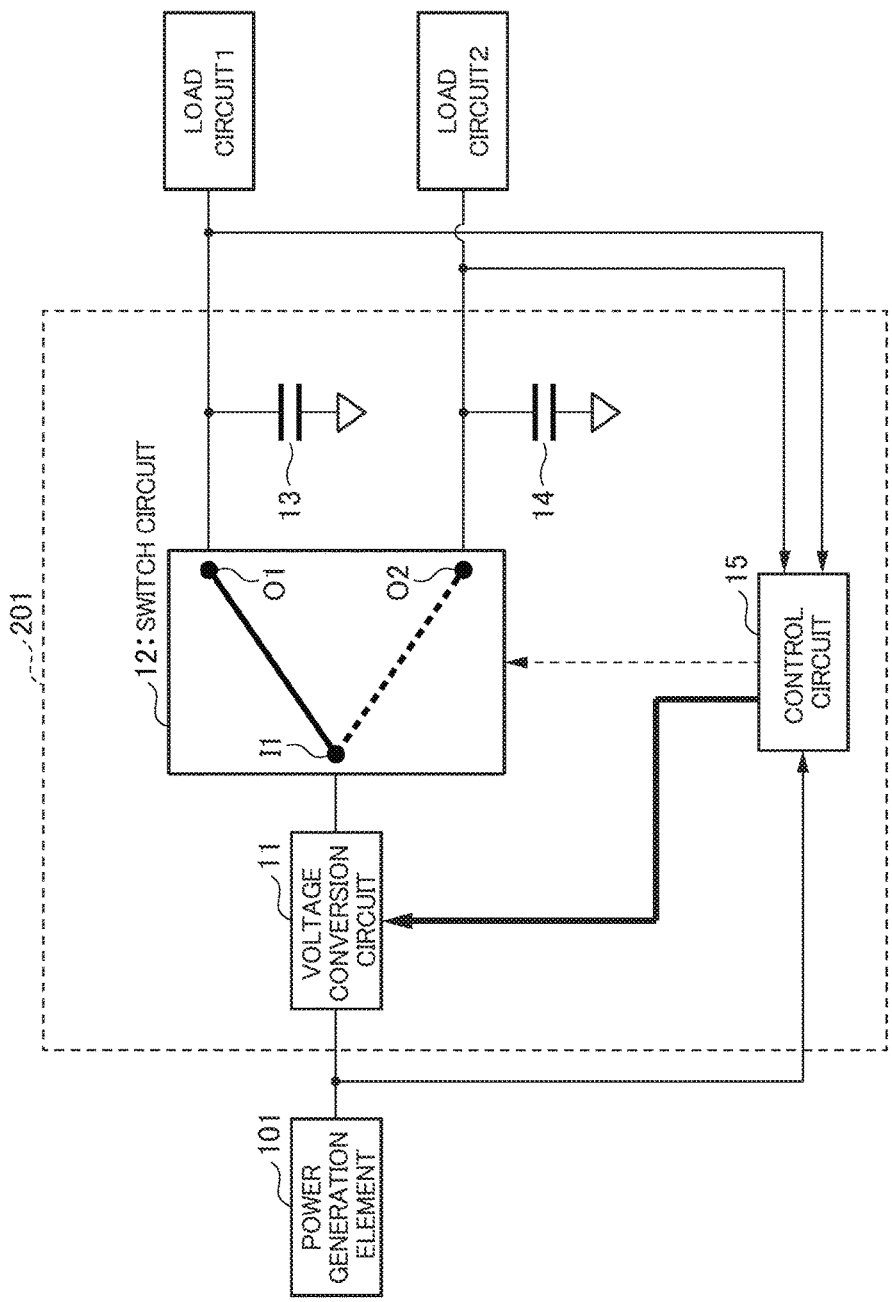
FIG. 6 is a configuration diagram of a power supply system including a power supply device according to a sixth embodiment.

FIG. 6 is a configuration diagram of a power supply system including a power supply device according to a sixth embodiment.

In the present embodiment, the control circuit 15 controls not only the switch circuit 12 but also the conversion rate in the voltage conversion circuit 11, simultaneously. The control circuit 15 controls an operation of the voltage conversion circuit 11 by pulse-width modulation. Specifically, the control circuit 15 outputs the pulse width in the voltage conversion circuit 11 and a control signal for on/off of a pulse, etc. The control circuit 15 controls the voltage conversion circuit 11 in conjunction with or not in conjunction with control of the switch circuit 12.

In the power supply system using energy harvesting, the power generation element 101 generally has a high internal impedance. Further, each of the power storage elements to be combined with the load circuits has a great capacitance value and a low impedance. Therefore, terminal voltages of the power storage elements 13, 14 are principal factors for determining the voltages of the load circuits 1, 2. On the basis of this as a background, when a switching-type voltage conversion circuit such as the voltage conversion circuit 11 according to the present embodiment is used, burst control is frequently used in the following manner: switching operation on the voltage conversion circuit 11 is continued on condition that the voltages of the power storage elements 13, 14 are lower than respective target values, whereas the switching operation is halted on condition that the voltages of the power storage elements 13, 14 are higher than the respective target values. Here, duty ratio control, which is performed on a switching pulse by a general switching regulator, is used as means not for controlling the voltages but for optimizing the efficiency of the voltage conversion circuit. For this reason, in a case where the target voltages of the load circuits 1, 2 differ from each other, the control circuit 15 measures the voltage values of the load circuits 1, 2, and determines the presence/absence of a control pulse output from the voltage conversion circuit 11 according to the connection state in the switch circuit 12 and based on whether the measured voltage values are higher/lower than the respective voltage target values. Further, in order to optimize the conversion efficiency under each of the aforementioned conditions of the load circuits 1, 2, the control circuit 15 adjusts the pulse width in the voltage conversion circuit 11, similarly according to the connection state in the switch circuit 12.

According to the present embodiment, the conversion rate in the voltage conversion circuit 11 is appropriately controlled. Accordingly, while the high efficient state of the voltage conversion circuit 11 is maintained, power supply to the load circuits can be performed.

Seventh Embodiment

Figure 7:
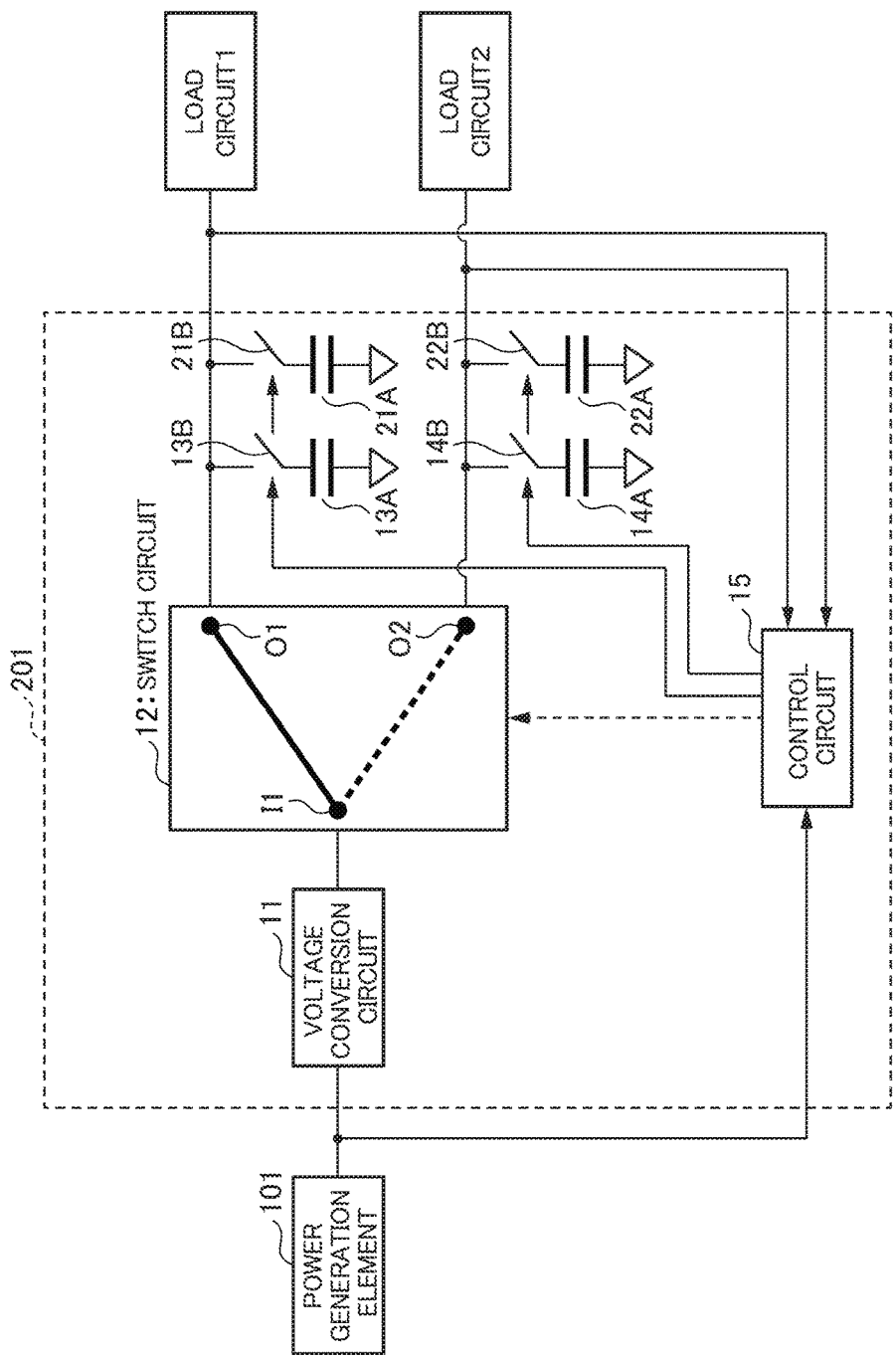
FIG. 7 is a configuration diagram of a power supply system including a power supply device according to a seventh embodiment.

FIG. 7 is a configuration diagram of a power supply system including a power supply device according to a seventh embodiment.

In the present embodiment, the power storage element 13 includes two capacitive elements 13A, 21A and two switches 13B, 21B, and the power storage element 14 includes two capacitive elements 14A, 22A and two switches 14B, 22B. In the power storage element 13, the two capacitive elements 13A, 21A are connected to the load circuit 1 via the switches 13B, 21B, respectively. In the power storage element 14, the two capacitive elements 14A, 22A are connected to the load circuit 2 via the switches 14B, 22B, respectively.

Connection/non-connection of the capacitive elements 13A, 21A can be selected by the on/off of the switches 13B, 21B. Connection/non-connection of the capacitive elements 14A, 22A can be selected by the on/off of the switches 14B, 22B.

The switches 13B, 21B, 14B, 22B are controlled by the control circuit 15. As described in the sixth embodiment, such power storage elements as to each have a great capacitance value are generally used to be combined with the load circuits. As a result, the load circuits can be stably operated even under an unstable power generation condition. However, when the capacitance value is great, charging for reaching a target value takes a long time. In particular, the start of operations of the load circuits at a time of activation is delayed. For this reason, the power storage element is configured by a plurality of capacitive elements, and the plurality of switches are turned on step by step, so that the control circuit 15 performs charging of the plurality of capacitive elements sequentially. This operation is performed for each of the load circuits.

For example, in order to activate the load circuit 1, the control circuit 15 performs control such that, first, the switch 13B is turned on and the switch 21B is turned off to charge power from the power generation element 101 to the capacitive element 13A. The control circuit 15 is assumed to have turned on the power supply path, of the switch circuit 12, to the load circuit 1. When the control circuit 15 detects that the voltage of the capacitive element 13A exceeds a threshold, the control circuit 15 additionally turns on the switch 21B, and thereafter, performs charging of both the capacitive elements 13A, 21A. When the switch 21B is turned on, the half of the stored amount of power in the capacitive element 13A is transferred to the capacitive element 21A (it is assumed that the capacitance value of the capacitive element 13A is equal to that of the capacitive element 21A). When the voltages of the capacitive elements 13A, 21A, that is, the input voltage to the load circuit 1 reaches an operational voltage, an operation of the load circuit 1 is started. As a result of this control, both of high-speed activation of the load circuits and stable power supply can be achieved. The control of the switch circuit 12 having been described here is one example, and other various controls may be performed.

Eighth Embodiment

Figure 8:
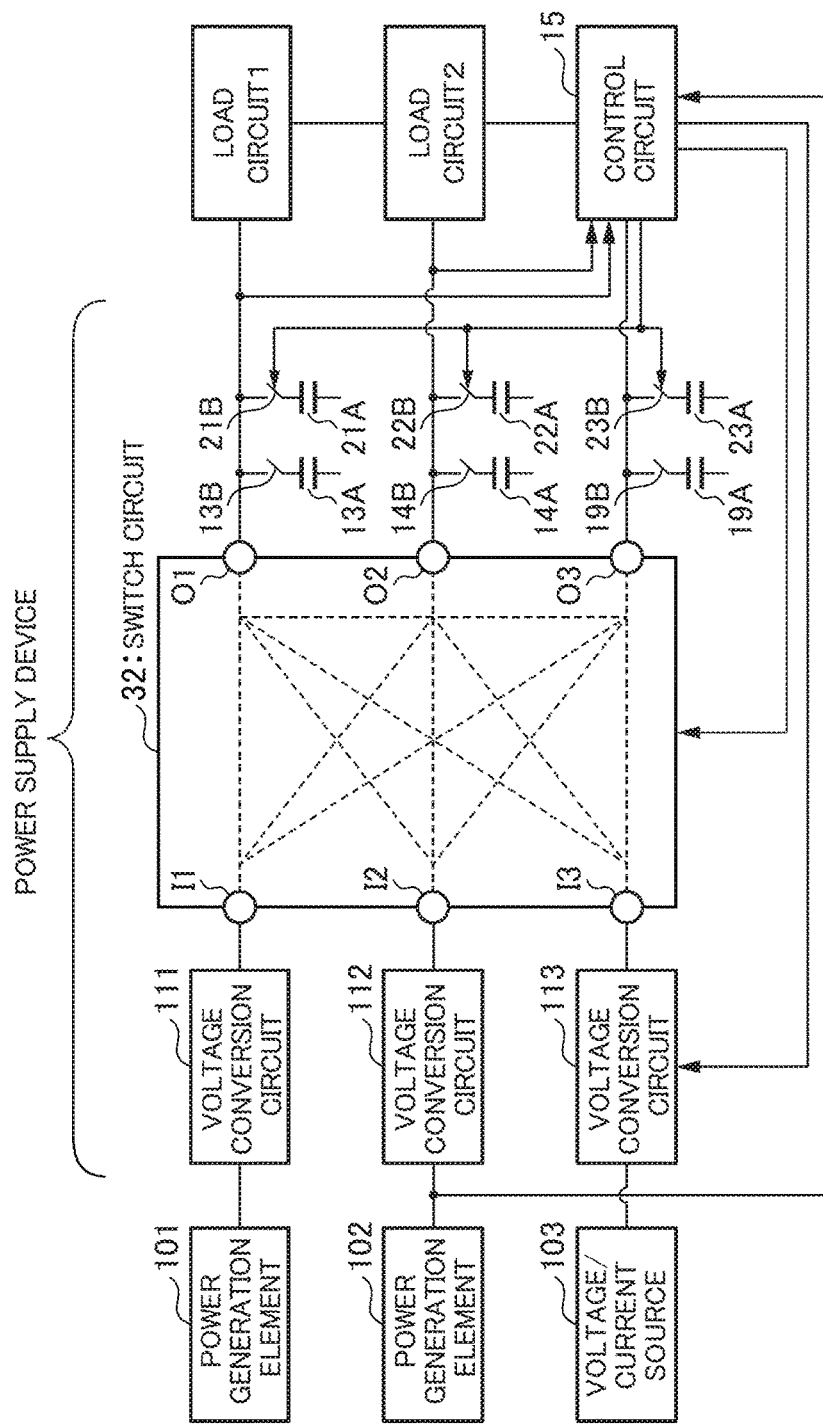
FIG. 8 is a configuration diagram of a power supply system including a power supply device according to an eighth embodiment.

FIG. 8 is a configuration diagram of a power supply system including a power supply device according to an eighth embodiment.

Whereas one power generation element is provided in the first to sixth embodiments, two power generation elements are provided in the present embodiment. The two power generation elements are the power generation elements 101, 102. In addition, a voltage source or a current source (hereinafter, "voltage/current source") 103 is provided. That is, there are three power input sources for the present device.

Power generated by the power generation element 101 is stepped up/down (is stepped up or stepped down) by the voltage conversion circuit 111, and is supplied to the switch circuit 32. Power generated by the power generation element 102 is stepped up/down (is stepped up or stepped down) by the voltage conversion circuit 112, and is supplied to the switch circuit 32. Power supplied from the voltage/current source 103 is stepped up/down (is stepped up or stepped down) by the voltage conversion circuit 113, and is supplied to the switch circuit 32. When power supply from the voltage/current source 103 is unnecessary, the power supply may be stopped by controlling the conversion rate in the voltage conversion circuit 113. As the voltage/current source 103, a battery or a power storage element may be used, for example.

The switch circuit 32 includes three input terminals I1, I2, I3. The input terminals I1, I2, I3 are connected to the voltage conversion circuits 111, 112, 113, respectively.

Three load circuits exist on an output side of the power supply device. Specifically, the load circuits 1, 2 and the control circuit 15 exist. The control circuit 15 is also one of the load circuits. For the presence of the three load circuits, three output terminals O1, O2, O3 are included in the switch circuit 32.

The two capacitive elements 13A, 21A in parallel with each other are connected to the load circuit 1 via the switches 13B, 21B, respectively. The two capacitive elements 14A, 22A in parallel with each other are connected to the load circuit 2 via the switches 14B, 22B, respectively. Two capacitive elements 19A, 23A in parallel with each other are connected to the control circuit 15 via switches 19B, 23B, respectively.

The switch circuit 32 further includes power supply paths from the input terminal I1 to the output terminals O1, O2, O3, power supply paths from the input terminal I2 to the output terminals O1, O2, O3, and power supply paths from the input terminal I3 to the output terminals O1, O2, O3. In addition, the switch circuit 32 further includes power supply paths to connect the output terminals O1, O2 to each other, and a power supply path to connect the output terminals O2, O3 to each other. Arbitrary one of these paths or an arbitrary combination thereof simultaneously can be controlled to be turned on. FIG. 8 shows the state where none of the paths are turned on (all the connections between the terminals are indicated by the broken lines).

The control circuit 15 selects an optimum power supply path in the switch circuit 32 according to the voltages of the capacitive elements, controls the switches for the capacitive elements, and thereby, optimizes power supply amounts to the load circuits and the capacitive elements. At least one of the voltage of power generated by the power generation elements 101, 102, the voltage of power outputted from the voltage conversion circuit, and the voltage of power required by the load circuits may be used in addition to the voltages of the capacitive elements. Further, the internal voltage of the voltage conversion circuit may be used. For example, the voltage of an intermediate node between an AC-DC conversion circuit and a DC-DC conversion circuit may be used when the AC-DC conversion circuit and the DC-DC conversion circuit are included in the voltage conversion circuit. The control circuit 15 may set the on state of the power supply path between the input terminal I3 and the output terminal O3 in the switch circuit 32 so as to constantly operate using power from the voltage/current source 103.

For example, it is assumed that, in an operation example, the power generation element 101 is a piezo-element which performs vibration power generation, and the power generation element 102 is a Peltier element which performs thermal temperature difference power generation. In this case, under most use conditions, a high output voltage from the power generation element 101 is easily ensured but a continuous output is not obtained therefrom. On the other hand, the output voltage from the power generation element 102 is generally low but less-fluctuating output power is obtained therefrom under most use conditions. Thus, the switch circuit 32 is controlled such that most of the time is spent for using power by vibration generation for the load circuit that requires a higher power supply voltage, and for using a power output by thermal temperature difference generation for the load circuit that requires a lower power supply voltage, whereby the efficiency of the entire system can be enhanced. In the case having been described here, the voltage conversion circuit 111 is assumed to be a step-down circuit and the voltage conversion circuit 112 is assumed to be a step-up circuit.

Further, the switch circuit 32 may be set such that power outputs by thermoelectric power generation alone are temporarily supplied to all the load circuits at the same time. Alternatively, under a condition where a particular one of the load circuits requires a large current, the switch circuit 32 may be set such that outputs of both power by vibration generation and power by thermoelectric power generation are supplied to the particular load circuit.

As described above, even in a case where the plurality of power generation elements and the plurality of input power paths from the voltage/current source are provided, a power supply amount and a power storage amount in the entire system can be optimized without necessity of providing the output side with a voltage conversion circuit for each of the load circuits.

Ninth Embodiment

Figure 9:
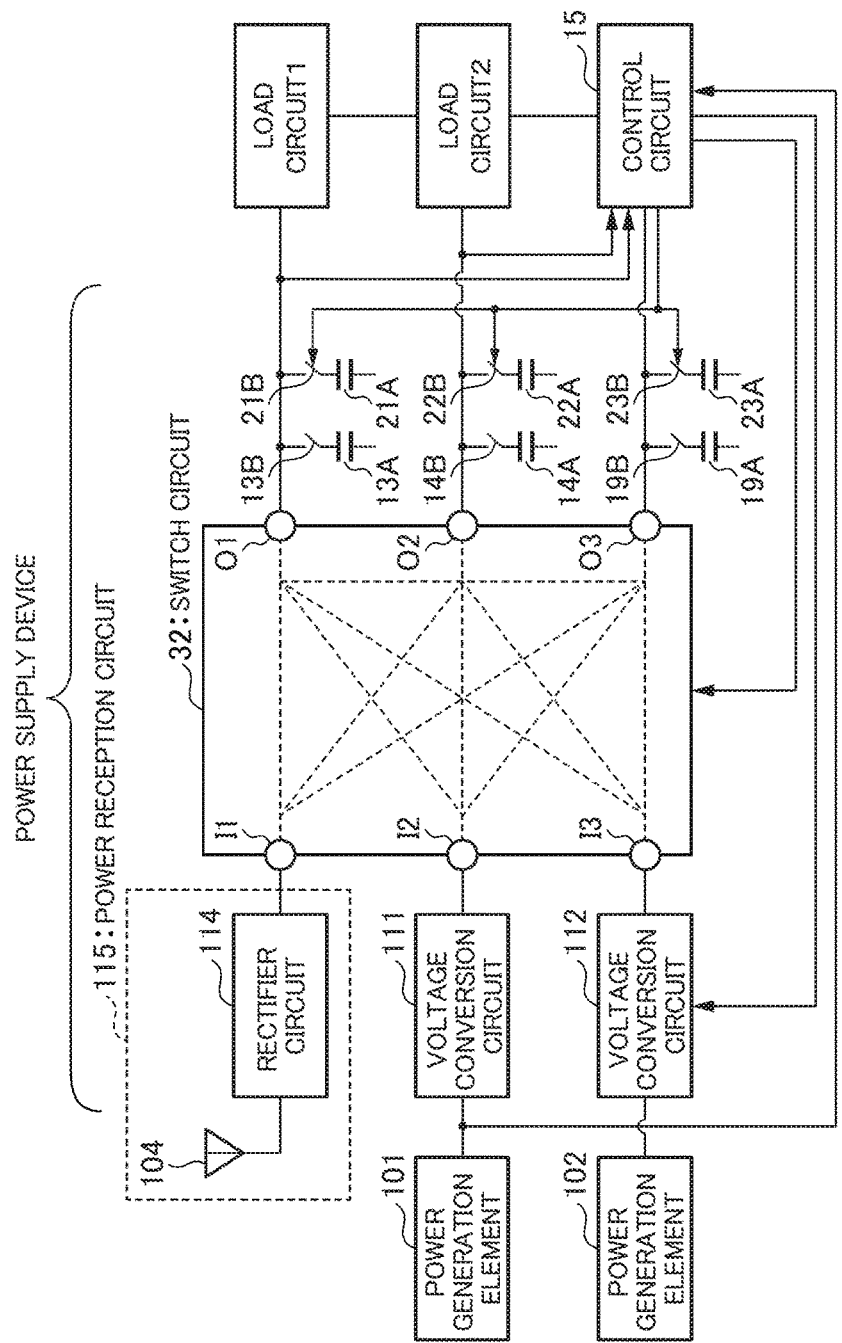
FIG. 9 is a configuration diagram of a power supply system including a power supply device according to a ninth embodiment.

FIG. 9 is a configuration diagram of a power supply system including a power supply device according to a ninth embodiment.

As in the eighth embodiment (see FIG. 8), the ninth embodiment includes the two power generation elements 101, 102 and the voltage conversion circuits 111, 112. Unlike in FIG. 8, the output terminals of the voltage conversion circuits 111, 112 are connected to the input terminals I2, I3 of the switch circuit 32, respectively.

In addition to the power generation elements 101, 102, a power reception circuit 115 is provided. The power reception circuit 115 includes an antenna 104 and a rectifier circuit 114 connected to the antenna 104. The rectifier circuit 114 rectifies a radio frequency signal (RF signal) received via the antenna 104, and generates DC power. In some embodiments, the rectifier circuit 114 includes an AC-DC conversion circuit and a DC-DC conversion circuit capable of performing a step-up/down operation. The converted RF signal is a power-transmission signal transmitted from a high-frequency transmission device. An output terminal of the power reception circuit 115 is connected to the input terminal I1 of the switch circuit 32. Power generated by the power reception circuit 115 is supplied to the load circuits according to the power supply path set by the switch circuit 32.

The power reception circuit 115 is provided as described above. Accordingly, power can be stably supplied even in a case where power required by the load circuits is large or where an amount of power generated by the power generation element is insufficient. In this case, during control of the switch circuit 32, an output from the power reception circuit 115 can be treated equivalently to an output from the power generation element.

In the present embodiment, the power reception circuit 115 receives power wirelessly. Alternatively, the power reception circuit 115 may be a circuit configured to receive power by wire. For example, the power reception circuit 115 may be a circuit configured to receive, via a cable, AC power outputted from an AC power source and to rectify the received AC power.

Figure 10:
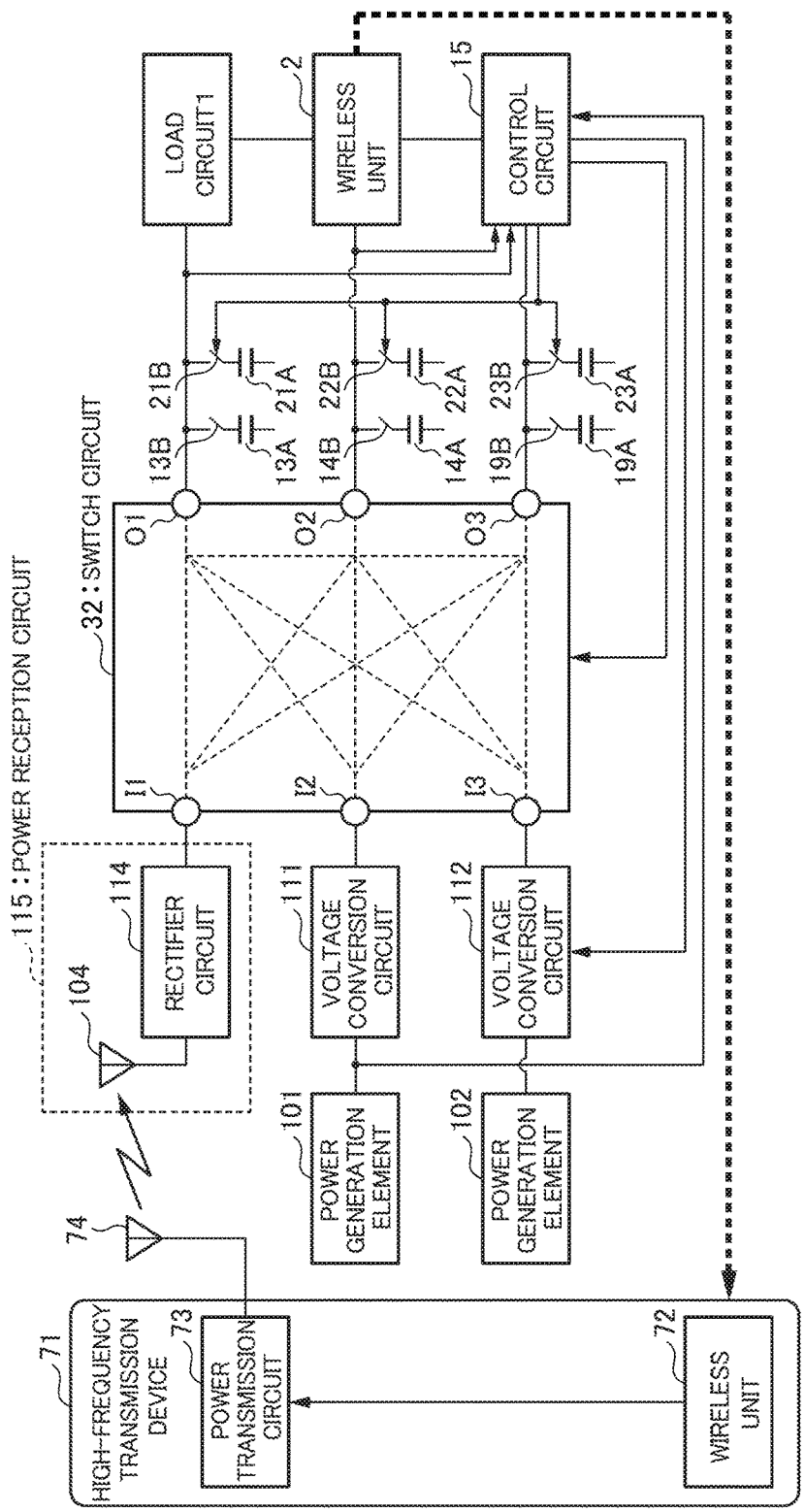
FIG. 10 is a configuration diagram of a wireless power transmission system including the power supply system in FIG. 9 and a high-frequency transmission device.

FIG. 10 is a configuration diagram of a wireless power transmission system obtained by combining a high-frequency transmission device with the power supply system in FIG. 9. In this example, the load circuit 2 is a wireless unit. The wireless unit 2 includes an antenna. The control circuit 15 may operate by using power supplied from at least one of the power reception circuit 115, the power generation element 101, and the power generation element 102. Alternatively, the control circuit 15 may operate by receiving power supply from an independent power supply circuit (not illustrated).

A high-frequency transmission device 71 includes a wireless unit 72, a power transmission circuit 73, and an antenna 74. The wireless unit 72 performs wireless communication with the wireless unit 2 of the power supply system in accordance with a predetermined communication protocol. The wireless unit 72 includes an antenna. The wireless unit 72 is connected to the power transmission circuit 73. The power transmission circuit 73 transmits, via the antenna 74, an RF signal (a power-transmission signal) for wireless power transmission.

An operation example is as follows. The control circuit 15 detects that power supply to the load circuit 1 or the load circuit (wireless unit 2) is in short (the power storage amount, of the power storage element, for the load circuit 1 or 2 is in short). For example, the control circuit 15 detects that an input voltage to the load circuit 1 or 2 has fallen below a threshold. Alternatively, the control circuit 15 detects the shortage of the power supply by detecting output voltages from the power generation elements or internal voltages of the voltage conversion circuits. When determining the shortage, the control circuit 15 instructs the wireless unit 2 to send a power transmission instruction. In accordance with the instruction, the wireless unit 2 sends data of a power transmission instruction. The wireless unit 72 of the high-frequency transmission device 71 receives the power transmission instruction and instructs the power transmission circuit 73 to send an RF signal (a power-transmission signal). In accordance with the instruction, the power transmission circuit 73 sends a power-transmission signal via the antenna 74. The power reception circuit 115 receives the power-transmission signal via the antenna 104, performs rectification at the rectifier circuit 114, and outputs DC power.

As a result of providing the high-frequency transmission device as described above, necessarily sufficient power can be supplied to the load circuit according to power required by the load circuits, and thus, a stable operation and high efficiency of the entire power supply system can be achieved. That is, in a case where an amount of power generated by the power generation element is in short, or where power required by the load circuits is large, power supply through wireless power transmission is selectively performed. As a result, power supply to the load circuits can be stabilized and the power efficiency of the entire system can be enhanced.

Tenth Embodiment

Figure 11:
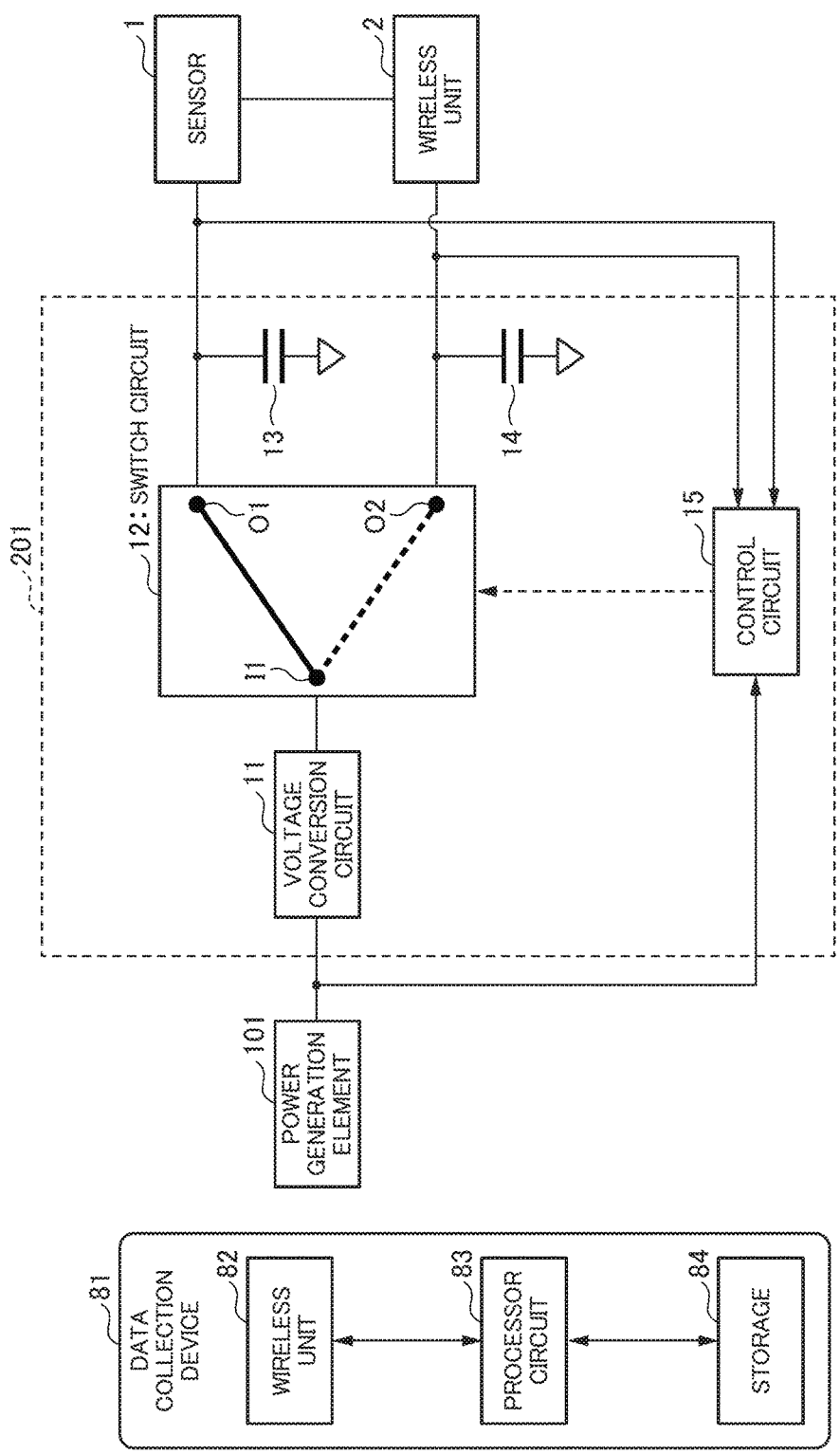
FIG. 11 is a configuration diagram of a sensor system according to a tenth embodiment.

FIG. 11 is a configuration diagram of a sensor system according to an eleventh embodiment. The sensor system includes the power supply system illustrated in FIG. 1 and a data collection device 81. In the power supply system, the load circuit 1 is a sensor and the load circuit 2 is a wireless device. The wireless device 2 includes an antenna. The wireless device 2 is connected to the sensor 1, and receives data detected by the sensor 1 and transmits the data to the data collection device 81. The power supply system is a sensor terminal arranged on a communication network. Although one sensor terminal is illustrated here, a plurality of sensor terminals may exist.

The data collection device 81 includes a wireless unit 82, a processor circuit 83, and a storage 84, and collects data from the sensor terminal. The wireless unit 82 receives data from the wireless device 2 in the power supply system. The wireless unit 82 includes an antenna. The wireless unit 82 provides the received data to the processor circuit 83. The processor circuit 83 stores the data in a database of the storage 84. The storage 84 is a hardware storage device such as a memory, an SSD (solid state drive), or a hard disk. The memory may be a non-volatile memory, a volatile memory, or a combination thereof.

The present sensor system uses the power supply system in FIG. 1. Alternatively, any of the power supply systems in FIGS. 2 to 9 and the wireless power transmission system in FIG. 10 may be used.

According to the present embodiment, power can be stably supplied from an unstable power source (power generation element) as in energy harvesting, etc., by use of any of the aforementioned embodiments. This eliminates necessity of incorporating a primary battery into a sensor terminal (or eliminates necessity of exchanging primary batteries, or allows reduction in the frequency of exchanging primary batteries). Accordingly, downsizing can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A power supply device comprising:
   a voltage conversion circuit configured to convert a voltage of power generated by a power generation element;
   a plurality of power storage elements connected in parallel with respective load circuits;
   a first switch circuit configured to switch an electrical connection between the voltage conversion circuit and each of the plurality of power storage elements;
   a second switch circuit configured to switch an electrical connection between two of the plurality of power storage elements; and
   a control circuit configured to measure voltages of the plurality of power storage elements and to control the first switch circuit and the second switch circuit based on the measured voltages,
   wherein the load circuit connected to one of the two power storage elements includes a power storage capacity or a secondary battery.

2. The power supply device according to claim 1, wherein the control circuit is configured to measure a voltage of the power storage element electrically connected to the voltage conversion circuit, and a voltage of the power storage element not electrically connected to the voltage conversion circuit.

3. The power supply device according to claim 1, wherein the control circuit is configured to
   measure a voltage of the power storage element electrically connected to the voltage conversion circuit, and
   measure at least one of an output voltage from the power generation element, an input voltage to the voltage conversion circuit, an output voltage from the voltage conversion circuit, and an internal voltage of the voltage conversion circuit.

4. The power supply device according to claim 1, wherein the voltage conversion circuit is not connected to any of the plurality of power storage elements when the control circuit is not activated.

5. The power supply device according to claim 1, wherein one of the plurality of load circuits is the control circuit.

6. The power supply device according to claim 5, wherein the first switch circuit is configured to connect the voltage conversion circuit to the control circuit when the control circuit is not activated.

7. The power supply device according to claim 1, wherein the control circuit is configured to control a conversion rate in the voltage conversion circuit based on the measured voltages.

8. The power supply device according to claim 1, wherein the plurality of power storage elements each include a plurality of capacitive elements connected in parallel with one another and a plurality of third switches configured to connect the plurality of capacitive elements to the load circuits, and the control circuit is configured to control the plurality of third switches of the plurality of power storage elements based on the measured voltages.

9. The power supply device according to claim 1, further comprising at least one of a voltage source, a current source, and a power reception circuit configured to receive power by wire or wirelessly, wherein the first switch circuit is configured to switch an electrical connection between the at least one of the voltage source, the current source and the power reception circuit and each of the plurality of power storage elements.

10. The power supply device according to claim 9, wherein the power reception circuit includes an antenna and a rectifier circuit, and the rectifier circuit is configured to receive a power-transmission signal via the antenna, rectify the received power-transmission signal, and output the rectified signal.

11. The power supply device according to claim 10, wherein one of the plurality of load circuits is a wireless unit, the control circuit is configured to generate a transmission instruction for the power-transmission signal, and the wireless unit is configured to send the transmission instruction to a signal transmitter configured to transmit the power-transmission signal.

12. A power supply system comprising:

the power supply device according to claim 1; and the power generation element.

13. The power supply system according to claim 12, further comprising the plurality of load circuits.

14. A sensor system comprising:

a sensor terminal; and a data collection device, the sensor terminal comprising the power supply device according to claim 1, the power generation element, and the plurality of load circuits, one of the plurality of load circuits including a sensor, another one of the plurality of load circuits including a first wireless unit configured to transmit data detected by the sensor; and the data collection device comprising a second wireless unit configured to receive the data from the first wireless unit, and a storage configured to store the data received by the second wireless unit.

* * * * *